United States Patent
Brown et al.

(10) Patent No.: US 7,779,308 B2
(45) Date of Patent: Aug. 17, 2010

(54) ERROR PROCESSING ACROSS MULTIPLE INITIATOR NETWORK

(75) Inventors: Joanna Katharine Brown, Winchester (GB); Michael John Jones, Cedar Park, TX (US); David Ray Kahler, Tucson, AZ (US); David Lawrence Leskovec, Corvallis, OR (US); Roderick Guy Charles Moore, Bournemouth (GB); Tram Thi Mai Nguyen, San Jose, CA (US); Jonathan Ian Settle, Winchester (GB); Thomas van der Veen, Hants (GB); Ronald J. Venturi, Littleton (GB)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 11/766,492

(22) Filed: Jun. 21, 2007

(65) Prior Publication Data

US 2008/0320332 A1    Dec. 25, 2008

(51) Int. Cl.
*G06F 11/00* (2006.01)
(52) U.S. Cl. .......................... 714/48; 714/4
(58) Field of Classification Search .................... 714/48
See application file for complete search history.

(56) References Cited

U.S. PATENT DOCUMENTS

| 5,463,768 A | 10/1995 | Cuddihy et al. |
| 5,485,573 A | 1/1996 | Tandon |
| 5,555,389 A | 9/1996 | Satoh et al. |
| 5,619,644 A | 4/1997 | Crockett et al. |
| 5,740,357 A * | 4/1998 | Gardiner et al. ............... 714/57 |
| 5,761,212 A | 6/1998 | Foland, Jr. et al. |
| 6,101,588 A * | 8/2000 | Farley ........................ 711/168 |

(Continued)

FOREIGN PATENT DOCUMENTS

GB    2405501 A    3/2005

(Continued)

OTHER PUBLICATIONS

U.S. Appl. No. 11/464,320, filed Aug. 14, 2006, Basham et al.

(Continued)

*Primary Examiner*—Scott T Baderman
*Assistant Examiner*—Kamini Patel
(74) *Attorney, Agent, or Firm*—Stephen R. Tkacs; Stephen J. Walder, Jr.; Randall J. Bluestone

(57) ABSTRACT

An architecture for error log processing is provided. Each error log is given a defined priority and mapped to an error recovery procedure (ERP) to be run if the log is seen. The system has a plurality of software layers to process the errors. Each software layer processes the error independently. Errors are reported to a higher software stack when error recovery fails from the lower stack ERPs and recovery is non-transparent. If the system host identified for error processing fails, the control of the ERP is transferred during the failover process. Non-obvious failed component isolating ERPs are grouped to be run together to assist in isolating the failed component. Prioritization of the error systems may be based on a plurality of criteria. ERPs are assigned to run within a particular software stack.

14 Claims, 5 Drawing Sheets

U.S. PATENT DOCUMENTS

| | | | |
|---|---|---|---|
| 6,148,414 A * | 11/2000 | Brown et al. | 714/9 |
| 6,199,104 B1 | 3/2001 | Delph | |
| 6,223,544 B1 | 5/2001 | Seem | |
| 6,247,103 B1 | 6/2001 | Kern et al. | |
| 6,345,369 B1 | 2/2002 | Kitamorn et al. | |
| 6,643,802 B1 | 11/2003 | Frost et al. | |
| 6,769,071 B1 | 7/2004 | Cheng et al. | |
| 6,772,290 B1 | 8/2004 | Bromley et al. | |
| 6,802,020 B1 | 10/2004 | Smith | |
| 6,880,101 B2 | 4/2005 | Golasky et al. | |
| 6,948,102 B2 | 9/2005 | Smith | |
| 7,003,702 B2 * | 2/2006 | Budd et al. | 714/52 |
| 7,032,019 B1 | 4/2006 | Noguchi et al. | |
| 7,120,832 B2 | 10/2006 | Collins et al. | |
| 7,210,071 B2 * | 4/2007 | Deacon et al. | 714/45 |
| 7,240,234 B2 * | 7/2007 | Morita et al. | 714/4 |
| 7,370,241 B2 | 5/2008 | Nicholson et al. | |
| 7,409,594 B2 * | 8/2008 | Mukherjee et al. | 714/26 |
| 7,676,702 B2 | 3/2010 | Basham et al. | |
| 2003/0061331 A1 | 3/2003 | Nakamura et al. | |
| 2003/0079074 A1 * | 4/2003 | Sicola et al. | 710/305 |
| 2003/0120751 A1 | 6/2003 | Husain et al. | |
| 2003/0140278 A1 | 7/2003 | Holland et al. | |
| 2003/0140299 A1 | 7/2003 | Duncan et al. | |
| 2003/0221155 A1 | 11/2003 | Weibel et al. | |
| 2004/0015722 A1 | 1/2004 | Klotz et al. | |
| 2004/0047354 A1 | 3/2004 | Slater et al. | |
| 2004/0139168 A1 | 7/2004 | Tanaka et al. | |
| 2004/0153728 A1 | 8/2004 | Suzuki et al. | |
| 2004/0225926 A1 | 11/2004 | Scales et al. | |
| 2004/0243796 A1 | 12/2004 | Keohane et al. | |
| 2005/0015647 A1 | 1/2005 | Okada et al. | |
| 2005/0015685 A1 | 1/2005 | Yamamoto | |
| 2005/0022064 A1 | 1/2005 | Steinmetz et al. | |
| 2005/0044162 A1 | 2/2005 | Liang et al. | |
| 2005/0081080 A1 | 4/2005 | Bender et al. | |
| 2005/0166084 A1 | 7/2005 | Yagisawa et al. | |
| 2005/0216800 A1 | 9/2005 | Bicknell et al. | |
| 2006/0080430 A1 | 4/2006 | Barsuk | |
| 2006/0107129 A1 | 5/2006 | Franklin et al. | |
| 2006/0129759 A1 | 6/2006 | Bartlett et al. | |
| 2006/0168471 A1 | 7/2006 | Schulstad | |
| 2008/0126857 A1 | 5/2008 | Basham et al. | |
| 2008/0178048 A1 * | 7/2008 | Balazich et al. | 714/48 |
| 2008/0244331 A1 | 10/2008 | Grimes et al. | |
| 2008/0320332 A1 | 12/2008 | Brown et al. | |

FOREIGN PATENT DOCUMENTS

| | | |
|---|---|---|
| JP | 55-108064 | 8/1980 |
| WO | WO 2006/053898 A2 | 5/2006 |

OTHER PUBLICATIONS

U.S. Appl. No. 11/692,223, filed Mar. 28, 2007, Grimes et al.

Wang et al., "A High Density Two Dimensional Bar Code", Proceedings of the SPIE vol. 1384 High-Speed Inspection Architectures, Barcoding, and Character Recognition (1990), Nov. 5-7, 1990, pp. 169-175.

Barcaroli, Giulio, "An Integrated System for Edit and Imputation of Data in The Italian National Statistical Institute", Survey and Statistical Computing, Sep. 24-26, 1992, pp. 167-177.

"Execution Time Dynamic Data Collection at First Detection of Failure", IBM Corporation, Technical Disclosure Bulletin, TDB v37 n6B, 06-94, pp. 391-392.

Clark, Tom, "A Management Strategy for Fibre Channel-Arbitrated Loop", Internet Citation, [Online] XP002979440, http://www.networkbuyersguide.com/search/309003.htm, Mar. 1998, 10 pages.

Bancroft et al., "Functionality and Performance Evaluation of File Systems for Storage Area Networks (SAN)", IEEE Symposium on Mass Storage Systems, 2000, pp. 101-119.

J. Menon et al., "IBM Storage Tank—A heterogeneous scalable SAN file system", IBM Systems Journal, vol. 42, No. 2, 2003, pp. 250-267.

Mesnier et al., "Storage Area Networking-Object-Based Storage", IEEE Communications Magazine, vol. 41, No. 8, Aug. 2003, pp. 84-90.

Agrawal et al., "Policy-Based Validation of SAN Configuration", Proceedings of the Fifth IEEE International Workshop on Policies for Distributed Systems and Networks, 2004, 10 pages.

USPTO U.S. Appl. No. 11/464,320, Image File Wrapper printed from PAIR on Mar. 9, 2010, 3 pages.

USPTO U.S. Appl. No. 11/692,223, Image File Wrapper printed from PAIR on Mar. 9, 2010, 2 pages.

Communication pursuant to Article 94(3) EPC; Application No. 08 717 036.1-1225; Apr. 20, 2010, 4 pages.

Office Action mailed May 27, 2010 for U.S. Appl. No. 11/692,223; 16 pages.

RCE and Response to Final Office Action filed with the USPTO on May 18, 2010 for U.S. Appl. No. 11/692,223; 19 pages.

Troppens, Ulf et al., "Storage Networks Explained", Storage Networks Explained: Basics and Application of Fibre Channel SAN, NAS, iSCSI, InfiniBand and FCoE, Second Edition, 2009, 6 pages.

* cited by examiner

ERROR PROCESSING ACROSS MULTIPLE INITIATOR NETWORK

BACKGROUND

1. Technical Field

The present application relates generally to an improved data processing system and method. More specifically, the present application is directed to error processing across a multiple initiator network in an independent or self-contained host environment.

2. Description of Related Art

A storage area network (SAN) is a network of storage disks. In large enterprises, a SAN connects multiple servers to a centralized pool of disk storage. A host is a computer that acts as a source of information or signals. The term can refer to any computer, from a centralized mainframe to a server to a client machine. In a network, clients and servers are hosts because they are both sources of information in contrast to network devices, such as routers and switches, which are responsible only for directing traffic.

An initiator is a host-side endpoint in a communication session on a SAN. Initiators are typically connected to storage devices, such as hard disk drives, for example, through a network of controllers, routers, and switches. A switch, for instance, is a mechanical or electronic device that directs the flow of electrical or optical signals from one side to the other.

In a multiple initiator storage network, error symptoms are distributed among many initiators. Therefore, no one initiator has a holistic view of all the errors that are occurring in the network. These errors are logged by the initiator to the local attached host. The server may have one or more hosts, which each contain one or many initiators. Each host is treated independently and functions in a separate environment. Therefore, the host does not have the necessary holistic view of the underlying storage network.

An error on the network may appear in multiple separate symptoms on all hosts, one on each host, or one on only one of the hosts. A common trigger event on the network may result in different error symptoms being raised on each host due to the state of the local initiator at the time. If these error symptoms were processed independently, then each host may arrive at a different conclusion, which may result in a different error recovery procedure being followed by each host.

SUMMARY

The illustrative embodiments recognize the disadvantages of the prior art and provide an architecture for error log processing. Each error log is given a defined priority and mapped to an error recovery procedure (ERP) to be run if the log is seen. The system has a plurality of software layers to process the errors. Each software layer processes the error independently. The drive ERP is the lowest software stack while the system ERP is the highest software stack. Errors that impact one drive are handled in the drive ERP. Errors that impact the system data access of multiple drives are handled in the system ERP.

Errors are reported to a higher software stack when error recovery fails from the lower stack ERPs and recovery is non-transparent. If the system host identified for error processing fails, the control of the ERP is transferred during the failover process. Non-obvious failed component isolating ERPs are grouped to be run together to assist in isolating the failed component.

Prioritization of the error systems may be based on a plurality of criteria. ERPs are assigned to run within a particular software stack. The determination of which software stack runs a particular ERP is driven by system performance, timely handling and recovery of errors, and accuracy and clarity of isolation to the failing component.

In one illustrative embodiment, a computer program product comprises a computer recordable storage medium having a computer readable program recorded thereon. The computer readable program, when executed on a computing device, causes the computing device to receive an error event message indicating an error event in a first software stack within a plurality of software stacks in a network, determine a priority of the error event, assign an error recovery procedure for the error event to a second software stack within the plurality of software stacks in the network based on the priority of the error event, and run the error recovery procedure in the second software stack.

In one exemplary embodiment, assigning the error event comprises identifying a host to be in control of error processing for the received error event. In a further exemplary embodiment, the computer readable program, when executed on the computing device, further causes the computing device to transfer control of the error processing to another host in the network responsive to the host failing.

In another exemplary embodiment, identifying a host to be in control of error processing for the received error event comprises determining in a local host whether the local host already has a lock for a current error event, obtaining a lock for the new error event and running the error recovery procedure for the new error event in the local host if the local host does not already have a lock for a current error event, determining whether the received error event has a higher priority than the current error event if the local host already has a lock for a current error event, and continuing with the error recovery procedure for the current error event if the received error event does not have a higher priority than the current error event. In a still further exemplary embodiment, running the error recovery procedure in the software stack further comprises stopping the error recovery procedure for the current error event and running an error recovery procedure for the received error recovery procedure if the received error event has a higher priority than the current error event.

In yet another exemplary embodiment, the computer readable program causes the computing device to prioritize the error event based on at least one of isolation capability, impact of the error event, logical configuration, operating environment, or workload. In a further exemplary embodiment, the network comprises a drive software stack, a switch software stack, a controller software stack, an initiator software stack, and a system software stack.

In a still further exemplary embodiment, the computer readable program, when executed on the computing device, further causes the computing device to report the error event to a higher software stack when error recovery fails from the error recovery procedure. In another exemplary embodiment, the computer readable program, when executed on the computing device, further causes the computing device to group non-obvious failed component isolating error recovery processes to be run together to assist in isolating the failed component.

In another illustrative embodiment, a data processing system in a storage area network comprises a processor and a memory. The memory contains instructions which, when executed by the processor, cause the processor to receive an error event message indicating an error event in a first software stack within a plurality of software stacks in the network, determine a priority of the error event, assign an error recovery procedure for the error event to a second software stack within the plurality of software stacks in the network based on the priority of the error event, and run the error recovery procedure in the second software stack.

In one exemplary embodiment, the storage area network comprises a plurality of drives running a drive software stack and one or more switches connected to the plurality of drives. The one or more switches run a switch software stack. The storage area network further comprises one or more controllers connected to the one or more switches. The one or more controllers run a controller software stack. The storage area network further comprises one or more initiators connected to the one or more controllers. The one or more initiators run an initiator software stack. The storage area network further comprises one or more hosts connected to the one or more initiators. The one or more hosts run a system software stack.

In a further exemplary embodiment, the data processing system is a local host within the one or more hosts and wherein the memory contains instructions which, when executed by the processor, cause the processor to determine whether the local host already has a lock for a current error event, obtain a lock for the new error event and run the error recovery procedure for the new error event in the local host if the local host does not already have a lock for a current error event, determine whether the received error event has a higher priority than the current error event if the local host already has a lock for a current error event, and stop the error recovery procedure for the current error event and run an error recovery procedure for the received error recovery procedure if the received error event has a higher priority than the current error event.

In another exemplary embodiment, the instructions cause the processor to prioritize the error event based on at least one of isolation capability, impact of the error event, logical configuration, operating environment, or workload.

In a further illustrative embodiment, a method for error processing across a multiple initiator network comprises receiving an error event message indicating an error event in a first software stack within a plurality of software stacks in the network, determine a priority of the error event, assigning an error recovery procedure for the error event to a second software stack within the plurality of software stacks in the network based on the priority, and running the error recovery procedure in the second software stack.

In one exemplary embodiment, assigning the error event comprises identifying a host to be in control of error processing for the received error event. In a further exemplary embodiment, the method further comprises transferring control of the error processing to another host in the network responsive to the host failing.

In a still further exemplary embodiment, identifying a host to be in control of error processing for the received error event comprises determining in a local host whether the local host already has a lock for a current error event, obtaining a lock for the new error event and running the error recovery procedure for the new error event in the local host if the local host does not already have a lock for a current error event, determining whether the received error event has a higher priority than the current error event if the local host already has a lock for a current error event, and stopping the error recovery procedure for the current error event and running an error recovery procedure for the received error recovery procedure if the received error event has a higher priority than the current error event.

In another exemplary embodiment, prioritizing the error event comprises prioritizing the error event based on at least one of isolation capability, impact of the error event, logical configuration, operating environment, or workload. In yet another exemplary embodiment, the method further comprises reporting the error event to a higher software stack when error recovery fails from the error recovery procedure. In another exemplary embodiment, the method further comprises grouping non-obvious failed component isolating error recovery processes to be run together to assist in isolating the failed component.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
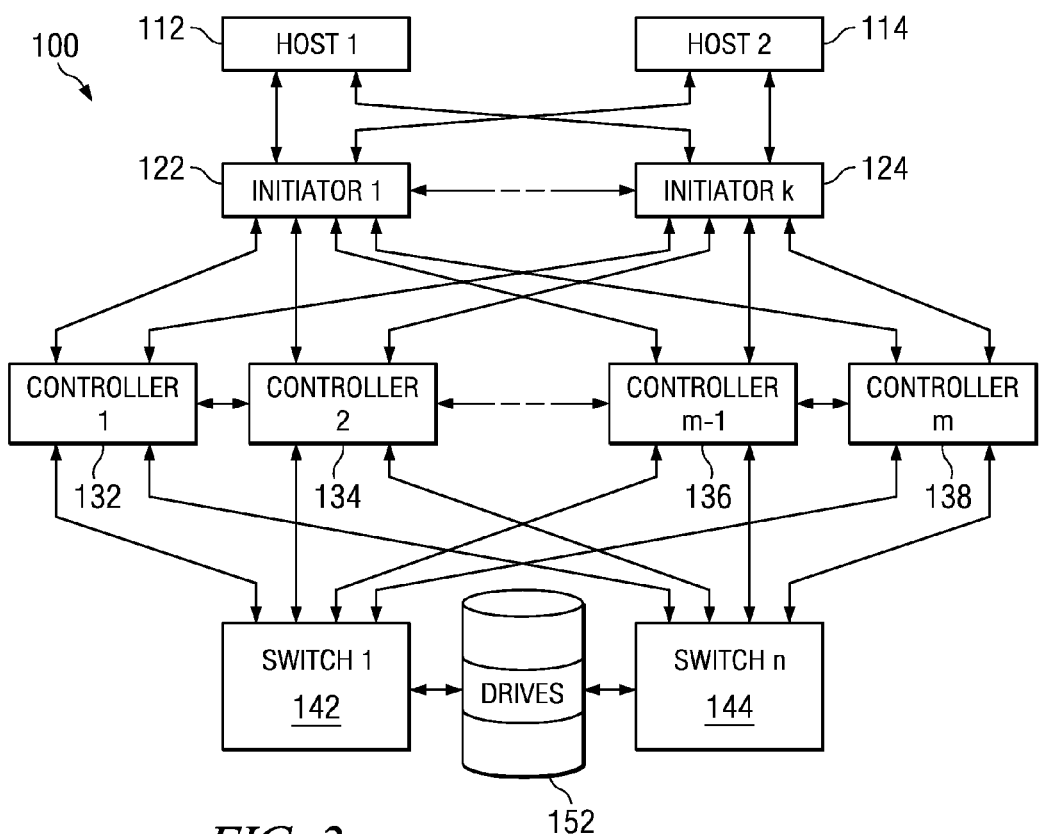
FIG. 1 depicts a pictorial representation of an exemplary storage area network in which aspects of the illustrative embodiments may be implemented.
Figure 2:
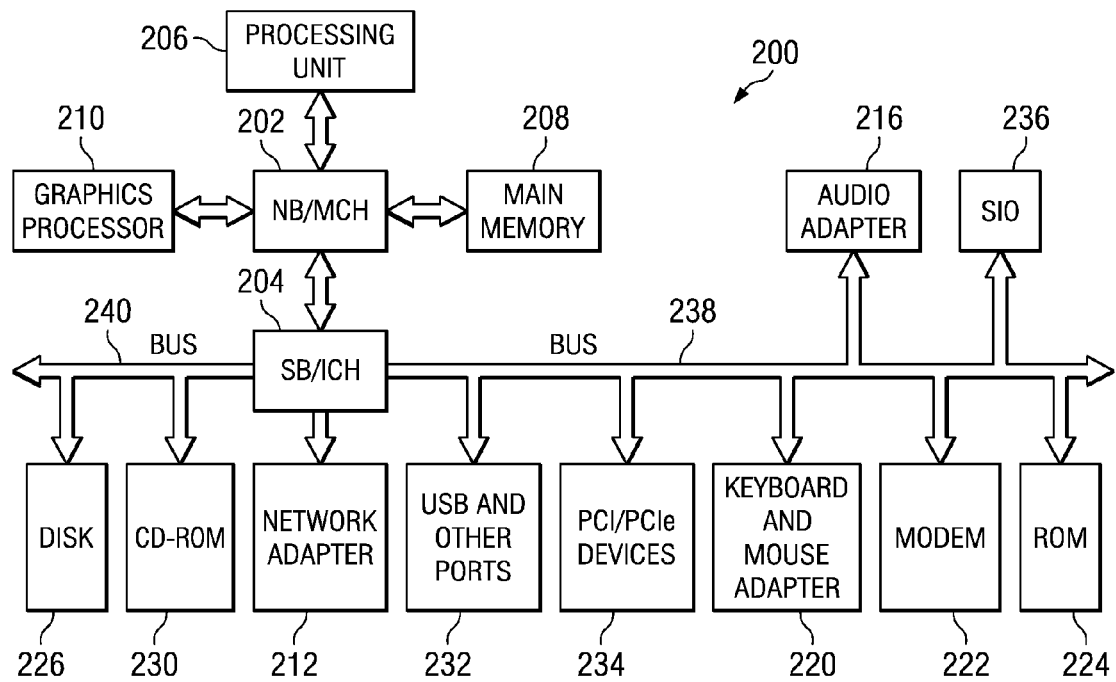
FIG. 2 is a block diagram of an exemplary data processing system in which aspects of the illustrative embodiments may be implemented.

With reference now to the figures and in particular with reference to FIGS. 1 and 2, exemplary diagrams of data processing environments are provided in which illustrative embodiments of the present invention may be implemented. It should be appreciated that FIGS. 1 and 2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary storage area network (SAN) in which aspects of the illustrative embodiments may be implemented. Storage area network (SAN) 100 may include a network of computers in which aspects of the illustrative embodiments may be implemented. Hosts 112 and 114 are connected to initiators 1-*k* 122-124. Initiators 122-124 are connected to controllers 1-*m* 132-138. Controllers 132-138 are connected to switches 1-*n* 142-144. Switches 142-144 are connected to drives 152.

In the depicted example, switches 142-144 may be, for example, fibre channel (FC) or serial attached SCSI (SAS) switches. Drives 152 may be FC or SAS hard disk drives, storage enclosures, just a bunch of disks (JBOD), or the like.

As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as hosts 112 and 114 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, switches, routers, or the like. In some illustrative examples, data processing system 200 may be a switch or controller which is configured with SAS or FC ports, for example. Essentially, data processing system 200 may be any known or later developed data processing system without architectural limitation.

An error on a storage area network may appear in multiple separate symptoms on all hosts, one on each host, or one on only one of the hosts. A common trigger event on the network may result in different error symptoms being raised on each host due to the state of the local initiator at the time. If these error symptoms were processed independently, then each host may arrive at a different conclusion, which may result in a different error recovery procedure being followed by each host.

One possible solution is to mirror and log all error symptoms to all hosts. This means that the hosts will remain in sync and come to the same conclusion when processing the error logs. This is undesirable in many systems due to the overheads involved in mirroring and syncing the logs. This would have to be done in real time over a secondary network, which may become a bottleneck.

In accordance with the illustrative embodiments, an architecture is provided for error log processing where each error log is given a defined priority and is mapped to an error recovery procedure (ERP). The error recovery procedure is run if the log is seen. The system has a plurality of software layers to process errors. Each software layer processes the error independently.

Figure 3:
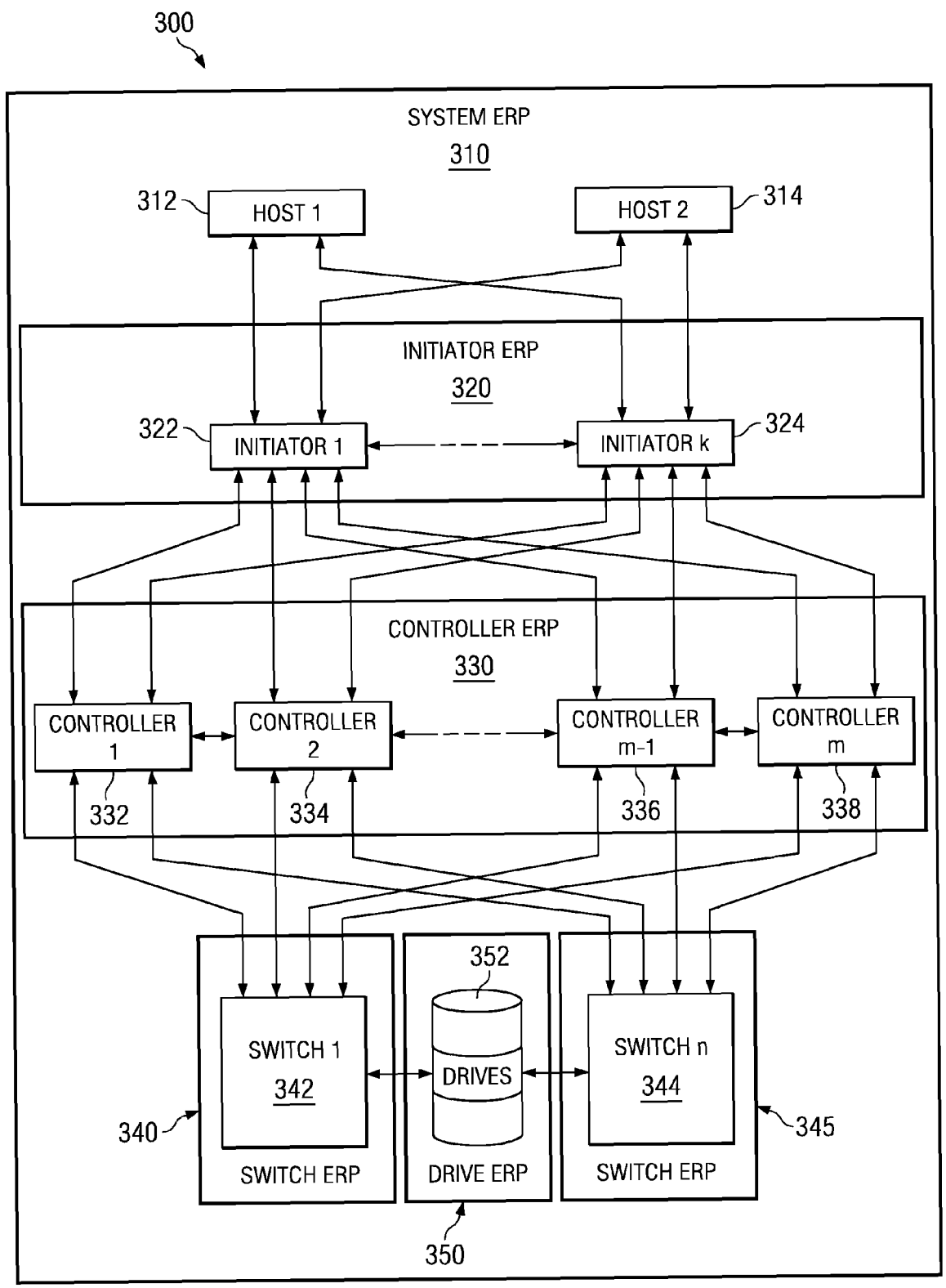
FIG. 3 is a pictorial representation of an exemplary storage area network (SAN) with error processing procedures in the software layers in accordance with an illustrative embodiment.

FIG. 3 is a pictorial representation of an exemplary storage area network (SAN) with error processing procedures in the software layers in accordance with an illustrative embodiment. Storage area network (SAN) 300 may include a network of computers in which aspects of the illustrative embodiments may be implemented. Hosts 312 and 314 are connected to initiators 1-$k$ 322-324. Initiators 322-324 are connected to controllers 1-$m$ 332-338. Controllers 332-338 are connected to switches 1-$n$ 342-344. Switches 342-344 are connected to drives 352.

In the depicted example, switches 342-344 may be, for example, fibre channel (FC) or serial attached SCSI (SAS) switches. Drives 352 may be FC or SAS hard disk drives, storage enclosures, just a bunch of disks (JBOD), or the like. As stated above, FIG. 3 is intended as an example, not as an architectural limitation for different embodiments of the present invention, and therefore, the particular elements shown in FIG. 3 should not be considered limiting with regard to the environments in which the illustrative embodiments of the present invention may be implemented.

In the depicted example, drive ERP 350 is the lowest software stack, while system ERP 310 is the highest software stack in the system. Errors that impact one drive are handled in drive ERP 350. Errors that impact a switch, such as one of switches 342-344, are handled by switch ERP 340 or switch ERP 345. Errors that impact the controllers 332-338 are handled by controller ERP 330. Errors that impact initiators 322-324 are handled by initiator ERP 320. Errors that impact the system data access of multiple drives are handled in system ERP 310.

Errors are reported to a higher software stack when error recovery fails from lower stack ERPs. Recovery is non-transparent. In other words, if drive ERP 350 fails to reassign data, drives 352 suffer reallocation failure. The highest level in each host has the global view of the system to know if this error is posing a problem, and if an additional ERP or a threshold algorithm needs to be run. The highest level is where prioritization and locking of errors and ERPs are implemented.

When an error occurs, the system identifies the error processing for a system with one or more hosts by processing the error symptom, serializing the error processing, and prioritizing the error to be processed. The system determines which system host is to be in control for the error recovery procedure (ERP). If the system host identified for error processing fails, the host transfers control of the ERP during the failover process. This process is applicable for systems with more than one host.

The system groups non-obvious failed component isolating ERPs to be run together to assist in isolating the failed component. The individual error events do not indicate a single failing component group consisting of one or more components. Instead, the error events indicate a set of two or more possible failing components groups, each of which has the same probability of being the failing component group. Analyzing a set of these errors over time can isolate to a single most likely failing component group. The failing component group can be further prioritized on the likelihood of failure based on field experience and knowledge of the system design.

The system prioritizes the error symptoms based on a plurality of criteria, including, for example, the isolation capability of a given error and the impact of the error. For example, an error is given a high priority when the failing component can be isolated. Errors causing loss of data access are given higher priority relative to errors causing loss of redundancy. The system may also tailor the error priority based on the logical configuration, operating environment, workload, or other factors. Critical/high impact errors may be allowed to impact the operating environment. One example may be accepting access loss to avoid a data loss risk; the error processing may examine the operating environment and sacrifice the concurrency of the system in favor of preventing error escalation.

The system assigns ERPs to run within a particular software stack. The determination of which software stack runs a particular ERP is driven by system performance, timely handling and recovery of errors, and accuracy and clarity of isolation to the failing component.

When the host with the acquired lock to run ERP fails, a host without a lock detects the error, removes the acquired lock from the failing host, obtains the lock, and performs the ERP. In the failover case where the partner had a lock and was running an ERP, the remaining host must analyze the current state and decide if a new ERP must be run. The local host does not need to have any knowledge of what the partner is running to make a decision from the local information that is available.

Certain error symptoms are not specific and the resultant ERPs may not be capable of isolating a problem from the one symptom log. The ERPs must be generic in their approach to recovery and, therefore, may be long running and disruptive to the system while running the failed component isolation. Other error symptoms, however, are very descriptive and can point to highly focused ERPs that will be efficient at failing component isolation.

In accordance with one illustrative embodiment, the priorities attached to each error log are defined such that higher priority error logs are those with the most description and will lead to focused ERPs. By locking cross-host on the priorities, the system allows the host that has the most information to attempt the failed component isolation. Cross-node prioritization gives the superior system response to an architecture favoring home-node or local node ERP response.

When one non-specific error occurs, other non-specific errors are checked to try to isolate the problem further. This may include queries of the current state, analysis of previous errors, and collection of any other system information that can help to define the error. For example, two initiators may see targets only through one path due to some error; however, one initiator may have disabled this path for a specific reason. The higher priority would be the error log associated with the disabled action, not the error log that indicates only one path is accessible. Hence, the host that did the disable action would run the required ERP.

Prioritization and locking architecturally solve the problem of secondary error symptoms being raised by one ERP while it is attempting to isolate the failing component. Any error raised if past the required threshold would attempt to gain a lock as above. This allows all hosts to ignore secondary events raised by one host's ERP unless it escalates locally into a severe error with higher priority.

An example of isolating a non-obvious failed component can be seen in a data integrity problem discovered and reported by a drive. Determining the component that injected the error is difficult. The error could have been injected by any one of the components between and including the initiator and the drive. Determining the failing component from this one occurrence cannot be done with any confidence. In fact, a single occurrence of an error such as this may be considered acceptable if it is corrected through retries or other error correction methodologies.

Figure 4:
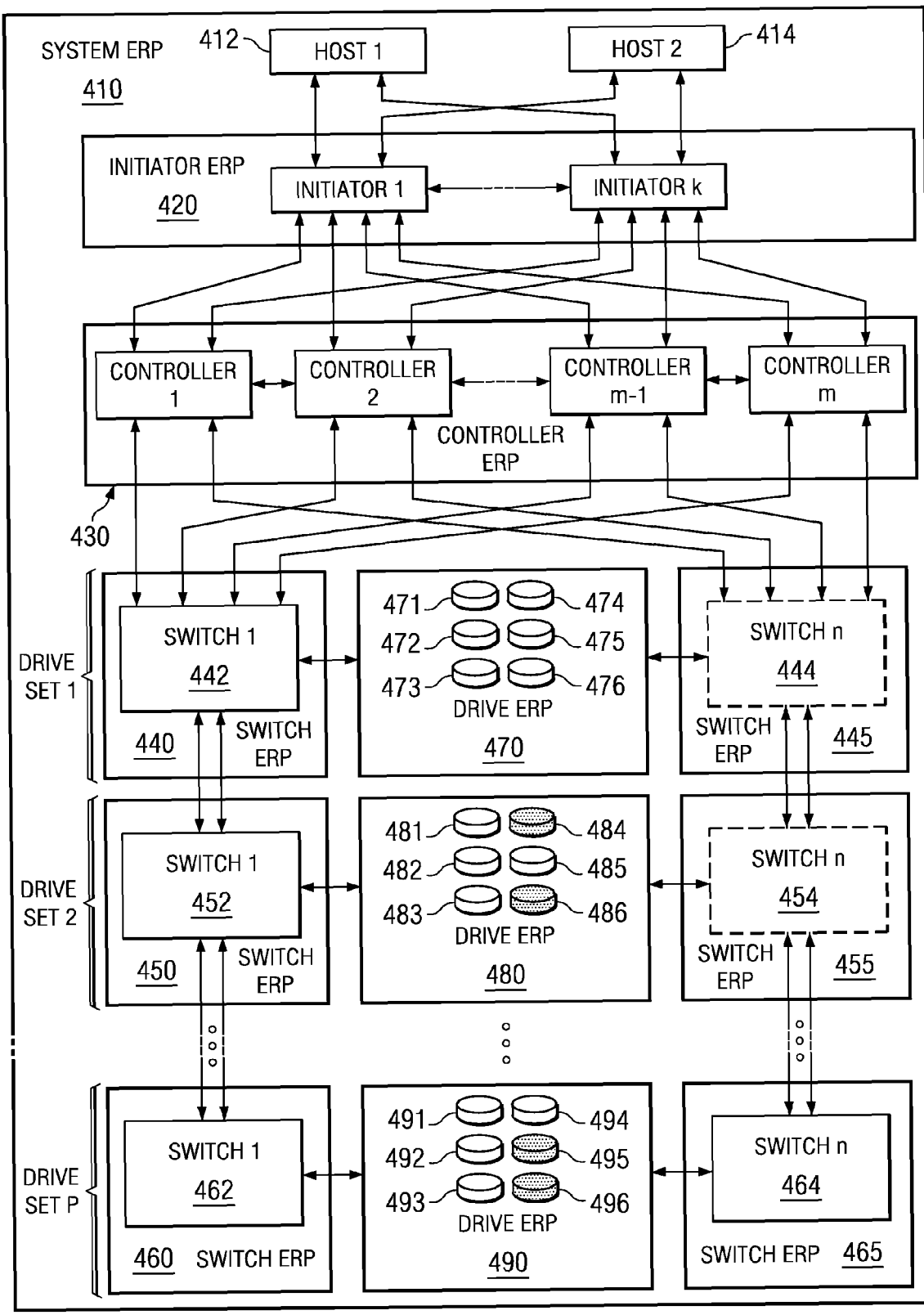
FIG. 4 illustrates an example scenario where a number of drives are reporting data integrity errors in accordance with an illustrative embodiment.

FIG. 4 illustrates an example scenario where a number of drives are reporting data integrity errors in accordance with an illustrative embodiment. In the depicted example, hosts 412 and 414 are connected to initiators 1-$k$, which are connected to controllers 1-$m$. Controllers 1-$m$ are connected to switches 1-$n$ 442-444. Switch 442 is connected to switch 452, and switch 444 is connected to switch 454. Switches 442-444 are connected to a set of drives 471-476 to form drive set 1. Switches 452-454 are connected to drives 481-486 to form drive set 2. Finally, switches 462-464 are connected to a set of drives 491-496 to form drive set p. While each set of switches is shown as n-number of switches, the number of switches in each drive set may vary depending upon the implementation. Similarly, a person of ordinary skill in the art will recognize that more or fewer drives, switches, controllers, initiators, and hosts may vary depending upon the implementation.

In the depicted example, switches 442-444, 452-454, and 462-464 may be, for example, fibre channel (FC) or serial attached SCSI (SAS) switches. Drives 471-476, 481-486, and 491-496 may be FC or SAS hard disk drives, storage enclosures, just a bunch of disks (JBOD), or the like. In the depicted example, drive ERPs 470, 480, and 490 form the lowest software stack, while system ERP 410 is the highest software stack in the system. Errors that impact one drive are handled in a respective one of drive ERPs 470, 480, or 490. Errors that impact a switch, such as one of switches 442-444, 452-454, or 462-464 are handled by a respective one of switch ERPs 440, 445, 450, 455, 460, or 465. Errors that impact controllers 1-$m$ are handled by controller ERP 430. Errors that impact initiators 1-$m$ are handled by initiator ERP 420. Errors that impact the system data access of multiple drives are handled in system ERP 410.

In theory, all drives have the same ERP. In other words, drive ERPs 470, 480, and 490 are the same code, just at different locations. Similarly, all switches have the same ERP code, and so forth. The field replaceable unit (FRU), or component, isolation differs on the location code.

As shown in FIG. 4, drives 484, 486, 495, and 496 are reporting data integrity errors. The analysis may determine that the suspect components are switches 444 and 454 and the cable(s) between these switches, where the cables are shown in FIG. 4 as solid lines with bidirectional arrows.

To solve this problem, the error reports must be analyzed over a time period. This ERP is performed in the highest software stack. During this analysis, the location of the drive reporting the error and the path the data flowed through to get to the drive are inspected. From this inspection, a small set of components common to the path of all transactions reporting errors is determined. One or more components within this small set are likely to be the cause of the errors being injected into the data. This leads to an acceptably small number of possible failing components. At this point, if an alternative path exists, the components in question may be disabled to improve system performance by eliminating the churn of error recovery and analysis.

Error symptoms that cause larger impact in the system are treated as having higher priority than error symptoms with lower impact. For example, errors causing data loss are treated as high priority and errors causing redundancy loss are in a lower priority. The prioritization of error symptoms may be tailored to logical configuration, operating environment, workload, or other factors. For example, one host can be locked out of doing an ERP by the partner host with an ERP keyed from a higher priority error symptom. The higher priority error symptom and associated ERP is the one with more information and, therefore, is more likely to prevent the data loss.

A simple sliding scale may be applied to the errors, which can be tuned by experience by updating the priorities that are attached to individual error logs as necessary. As each error log already maps to the defined ERP, all that changes is when the ERP is run with respect to other error logs of different priorities. Lower priority errors, or errors of the same priority as a currently running ERP, can be ignored in this scenario as the system only deals with the highest priority error. Each ERP, once it has been processed, should reanalyze the system for any remaining ongoing lower/same priority errors and run the relevant ERP if any exist.

Different ERPs may be run with different levels of the software stack. In general, ERPs should be run at as low of a level in the software stack as possible for the fastest reaction and recovery of errors within the system. Lower level ERPs should be concerned with actions that must be taken in the sub-second or sub-millisecond time frame. Actions at the lower levels are targeted at:
1) maintaining access to data;
2) maintaining data integrity; and
3) meeting performance guarantees.

These errors may be surfaced to the higher levels to either indicate that the lower level ERP failed and further action is required or to notify that the error occurred and was recovered. The notification may then be used by higher level ERPs for such purposes as analysis of non-specific errors or application of a threshold to remove a component after a certain number of recovered errors.

Higher level ERPs are less timely in nature. It may be minutes after the occurrence of an error before an ERP in the higher levels of the software stack isrun. The focus of the higher level ERPs are as follows:
1) recovery of unsuccessful lower level ERPs;
2) recovery from and analysis of non-specific errors that require a system level view including analysis of current state and past system events;
3) preventing error escalation to a system level impact; and
4) notification of error and request for service.

ERPs run at the highest level of the software stack often take longer to run as they gather large amounts of data about the system and previous error events. This level may see multiple error events triggered by a single failing component. Each host may see an error event triggered by a single failing component. The error event seen by each host may present the same or different symptoms depending on the system view from that host. In each of these scenarios, the ability to successfully identify the failing component and recover from the error as much as possible relies on prioritizing the error events.

Figure 5:
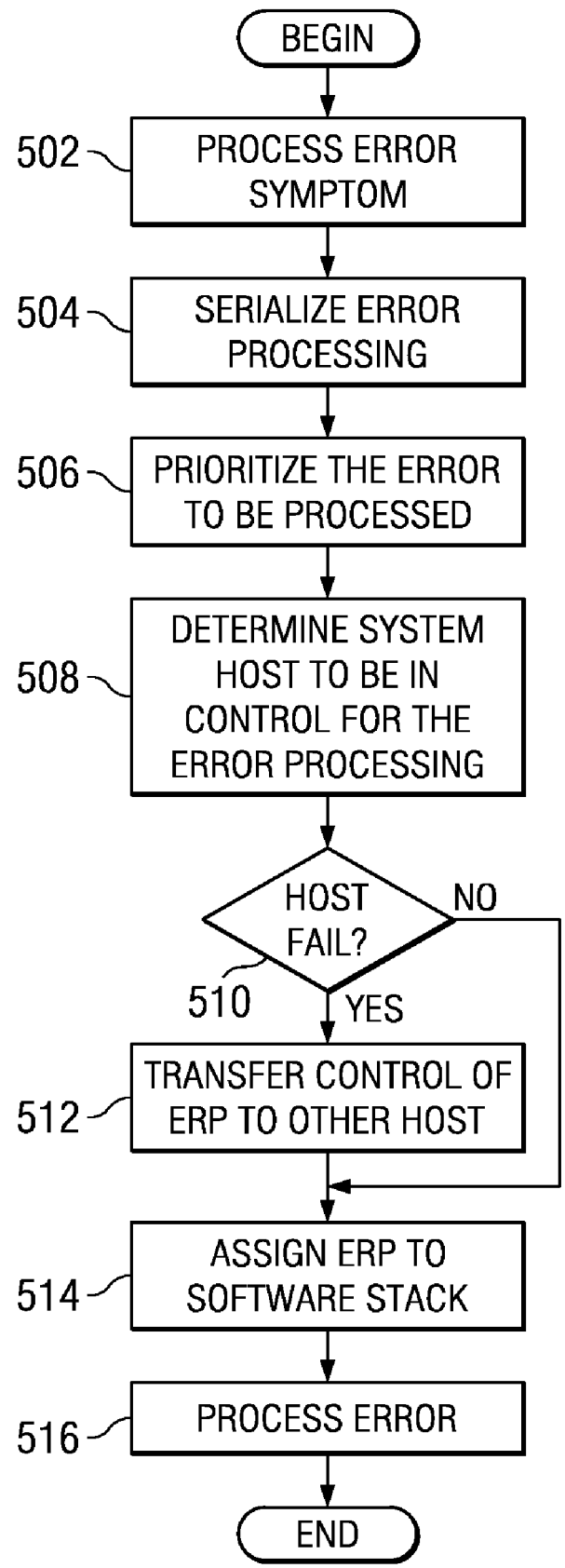
FIG. 5 is a flowchart illustrating operation of a system for error log processing in accordance with an illustrative embodiment; and, FIG. 6 is a flowchart illustrating the operation of a local host in processing an error recovery procedure in accordance with an illustrative embodiment.

FIG. 5 is a flowchart illustrating operation of a system for error log processing in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

With reference now to FIG. 5, operation begins and the system processes the error symptom (block 502). The error is detected in a software stack. For example, if a data access error occurs in a disk drive then the drive software stack detects the error, if a communication error occurs in a switch then the switch software stack detects the error, and so forth. Errors are communicated to the other software stacks. The hosts serialize the error processing (block 504). The hosts prioritize the error to be processed (block 506). The hosts then determine which system host is to be in control for the error processing (block 508).

The system determines whether the host fails (block 510). If the host fails, the host transfers control of error recovery procedure to another host during failover (block 512). Thereafter, or if the host does not fail in block 510, the host running the error recovery procedure assigns the ERP to the software stack (block 514). The assigned layer of the software stack then processes the error (block 516). Thereafter, operation ends.

Figure 6:
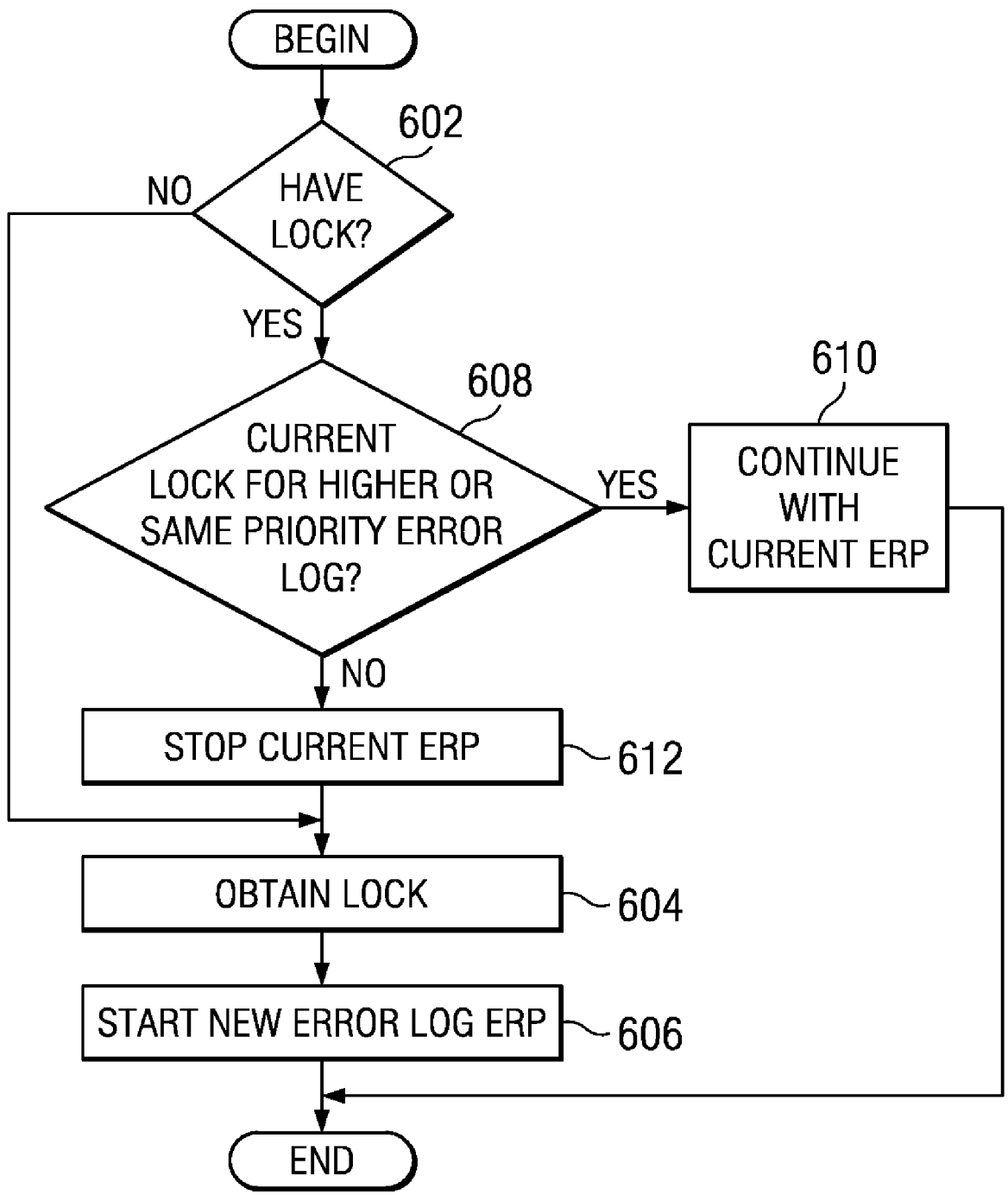

FIG. 6 is a flowchart illustrating the operation of a local host in processing an error recovery procedure in accordance with an illustrative embodiment. In this example, there is a single lock that any host can take, release, etc. One implementation may be to have a lock on each host; however, the treatment here is as a single lock across all hosts. When a host attempts to take a lock, it will lock out all the other hosts. When a host takes the lock, it is reflected as taken on all hosts. There is only a single ERP running at any given time. The ERP runs on the host that has the lock.

Operation begins when a threshold for a certain error symptom is reached and a host begins processing an ERP. The host determines whether it already has a lock for an error log (block 602). If the host does not already have a lock, the host obtains the lock for the error log (block 604) and starts the new error log ERP (block 606). Thereafter, operation ends.

If the host does already have a lock in block 602, the host determines whether the current lock is for an error log with a priority that is higher than or equal to the priority of the new error log (block 608). If the host does have a current lock with an equal or higher priority, the host continues to process the current ERP (block 610), and operation ends. If the host does not have a current lock with an equal or higher priority, then the local host stops its current ERP (block 612). Next, the local host obtains the lock for the higher priority ERP (block 604) and starts the new error log ERP (block 606). Thereafter, operation ends.

The only information that must be passed among the multiple hosts is the priority level of the current lock at each host if a lock is active. This leads to a very simple interface and low overhead in passing enough information to make a decision as to which host should attempt to process any outstanding errors.

Thus, the illustrative embodiments solve the disadvantages of the prior art by providing an architecture for error log processing. Each error log is given a defined priority and mapped to an error recovery procedure (ERP) to be run if the log is seen. The system has a plurality of software layers to process the errors. Each software layer processes the error independently. The drive ERP is the lowest software stack while the system ERP is the highest software stack. Errors that impact one drive are handled in the drive ERP. Errors that impact the system data access of multiple drives are handled in the system ERP.

Errors are reported to a higher software stack when error recovery fails from the lower stack ERPs and recovery is non-transparent. If the system host identified for error processing fails, the control of the ERP is transferred during the failover process. Non-obvious failed component isolating ERPs are grouped to be run together to assist in isolating the failed component.

Prioritization of the error systems may be based on a plurality of criteria. ERPs are assigned to run within a particular software stack. The determination of which software stack runs a particular ERP is driven by system performance, timely handling and recovery of errors, and accuracy and clarity of isolation to the failing component.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer recordable storage medium having a computer readable program recorded thereon, wherein the computer readable program, when executed on a computing device, causes the computing device to:
   receive an error event message indicating an error event in a first software stack within a plurality of software stacks in a network;
   determine a priority of the error event;
   assign an error recovery procedure for the error event to a second software stack within the plurality of software stacks in the network based on the priority of the error event; and
   run the error recovery procedure in the second software stack,
   wherein assigning the error recovery procedure comprises identifying a host to be in control of error processing for the received error event message; and
   wherein identifying the host to be in control of error processing for the received error event message comprises:
      determining in a local host whether the local host already has a lock for a current error event;
      if the local host does not already have the lock for the current error event, obtaining the lock for a new error event and running the error recovery procedure for the new error event in the local host;
      if the local host already has the lock for the current error event, determining whether the received error event has a higher priority than the current error event; and
      if the received error event does not have a higher priority than the current error event, continuing with the error recovery procedure for the current error event.

2. The computer program product of claim 1, wherein the computer readable program, when executed on the computing device, further causes the computing device to:
   transfer control of the error processing to another host in the network responsive to the host failing.

3. The computer program product of claim 1, wherein running the error recovery procedure in the second software stack further comprises:
   if the received error event has a higher priority than the current error event, stopping the error recovery procedure for the current error event and running an error recovery procedure for the received error recovery procedure.

4. The computer program product of claim 1, wherein the computer readable program causes the computing device to determine a priority of the error event based on at least one of isolation capability, impact of the error event, logical configuration, operating environment, or workload.

5. The computer program product of claim 1, wherein the plurality of software stacks comprises a drive software stack, a switch software stack, a controller software stack, an initiator software stack, and a system software stack.

6. The computer program product of claim 1, wherein the computer readable program, when executed on the computing device, further causes the computing device to:
   report the error event to a higher software stack when error recovery fails from the error recovery procedure.

7. The computer program product of claim 1, wherein the computer readable program, when executed on the computing device, further causes the computing device to:
   group non-obvious failed component isolating error recovery processes to be run together to assist in isolating the failed component.

8. A data processing system in a storage area network, comprising:
   a processor; and
   a memory, wherein the memory contains instruction which, when executed by the processor, cause the processor to:
      receive an error event message indicating an error event in a first software stack within a plurality of software stacks in the network;
      determine a priority of the error event;
      assign an error recovery procedure for the error event to a second software stack within the plurality of software stacks in the network based on the priority of the error event; and
      run the error recovery procedure in the second software stack,
   wherein the storage area network comprises:
      a plurality of drives running a drive software stack;
      one or more switches connected to the plurality of drives, wherein the one or more switches run a switch software stack;
      one or more controllers connected to the one or more switches, wherein the one or more controllers run a controller software stack;
      one or more initiators connected to the one or more controllers, wherein the one or more initiators run an initiator software stack; and
      one or more hosts connected to the one or more initiators, wherein the one or more hosts run a system software stack; and
   wherein the data processing system is a local host within the one or more hosts and wherein the memory contains instructions which, when executed by the processor, cause the processor to:
      determine whether the local host already has a lock for a current error event;
      if the local host does not already have a lock for a current error event, obtain a lock for the new error event and running the error recovery procedure for the new error event in the local host;
      if the local host already has a lock for a current error event, determine whether the received error event has a higher priority than the current error event; and
      if the received error has a higher priority than the current error event, stop the error recovery procedure for the current error event and running an error recovery procedure for the received error recovery procedure.

9. The data processing system of claim 8, wherein the instructions cause the processor to prioritize the error event based on at least one of isolation capability, impact of the error event, logical configuration, operating environment, or workload.

10. A method for error processing across a multiple initiator network, the method comprising:
    receiving an error event message indicating an error event in a first software stack within a plurality of software stacks in the network;
    determining a priority of the error event;

assigning an error recovery procedure for the error event to a second software stack within the plurality of software stacks in the network based on the priority of the error event; and running the error recovery procedure in the second software stack, wherein assigning the error recovery procedure comprises identifying a host to be in control of error processing for the received error event message; and wherein identifying a host to be in control of error processing for the received error event comprises:

determining in a local host whether the local host already has a lock for a current error event;

if the local host does not already have a lock for a current error event, obtaining a lock for the new error event and running the error recovery procedure for the new error event in the local host;

if the local host already has a lock for a current error event, determining whether the received error event has a higher priority than the current error event; and if the received error event has a higher priority than the current error event, stopping the error recovery procedure for the current error event and running an error recovery procedure for the received error recovery procedure.

11. The method of claim 10, further comprising:

responsive to the host failing, transferring control of the error processing to another host in the network.

12. The method of claim 10, wherein determining a priority of the error event comprises determining the priority of the error event based on at least one of isolation capability, impact of the error event, logical configuration, operating environment, or workload.

13. The method of claim 10, further comprising:

reporting the error event to a higher software stack when error recovery fails from the error recovery procedure.

14. The method of claim 10, further comprising:

grouping non-obvious failed component isolating error recovery processes to be run together to assist in isolating the failed component.

\* \* \* \* \*